July 22, 1947.  C. W. HANSELL  2,424,274
PULSE RECEIVING SYSTEM
Original Filed June 24, 1942
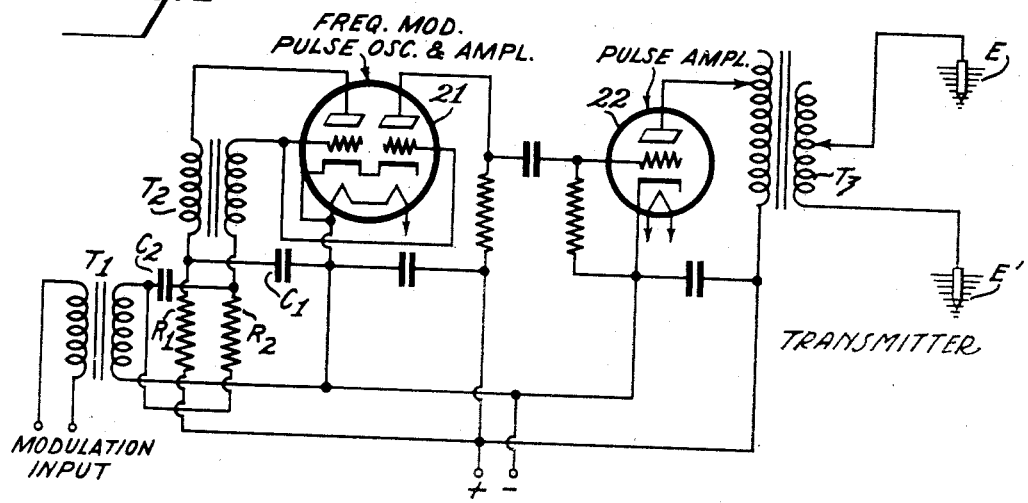
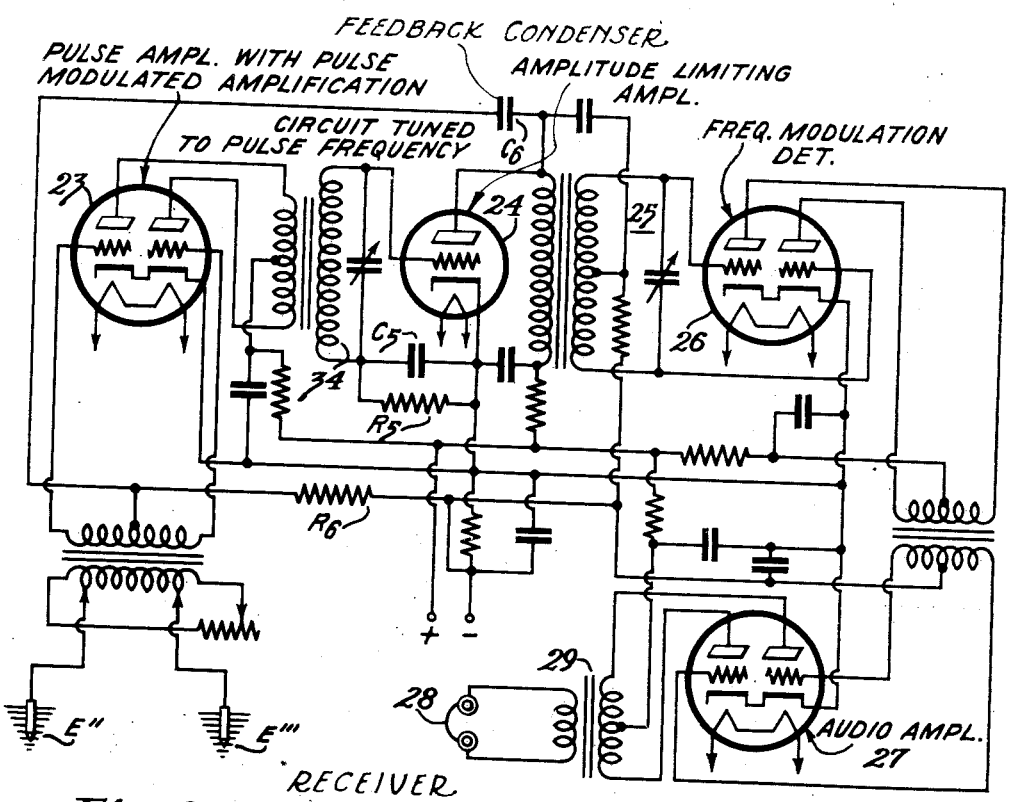
INVENTOR
Clarence W. Hansell
BY H.S. Grover
ATTORNEY Patented July 22, 1947

2,424,274

UNITED STATES PATENT OFFICE 2,424,274

PULSE RECEIVING SYSTEM

Clarence W. Hansell, Port Jefferson, N. Y., assignor to Radio Corporation of America, a corporation of Delaware Original application June 24, 1942, Serial No. 448,223. Divided and this application August 30, 1945, Serial No. 613,512

8 Claims. (Cl. 250—27)

The present invention relates to an improved earth signaling communication system employing electrical pulses, and is a division of my United States Patent 2,389,432, dated November 20, 1945.

Briefly stated, the invention consists in the use of very short high-power pulses delivered by the transmitter to two spaced ground connections, and likewise received by connecting a receiver between two spaced ground connections. These ground connections may comprise two ground electrodes which can be inserted into the earth a suitable distance apart, such as 100 feet more or less. The effectiveness and range of the system will, of course, vary with the distance between the ground connections, and by trial and error it is a comparatively simple matter to determine the minimum distance between earth connections for a particular range of communication. Generally speaking, the further apart the two ground connections of the transmitter and receiver are placed, the greater will be the distance range of communication, within certain limits. The term "ground or earth connections" used herein is not limited to a connection in the soil, since the electrodes for the transmitter and the receiver can be located in water, such as in a lake, or in the ocean for communication between two ships, or between a ship (or a submarine) and a shore station. It will be apparent that when the spaced electrodes are inserted in the ground or in the water, the effectiveness of the system may vary with the resistance of the earth or the water. There is, however, a compensating effect in respect to the effect of ground resistivity, because signals and noise tend to be influenced alike, leaving their ratios more or less alike, except for conditions where receiver noise limits the range of communication.

The communication system of the invention, employing short high-power pulses, has both military and civilian uses and possesses the following advantages among others: (1) A higher peak power can be transmitted than obtainable by the customary type of continuous wave transmitter equipment; (2) the system of the invention is very hard to interfere with, consequently the procedure known as "jamming" by an enemy in time of war has reduced effect; and (3) by making the receiver of the invention operate synchronously with the transmitter, or by using an adjustable threshold system in addition to limiting, it is possible to receive transmitted pulse signals despite extraneous and undesirable earth potentials.

The following is a more detailed description of the invention accompanied by a drawing, wherein:

Fig. 1 illustrates one pulse type transmitter in accordance with the invention, and Fig. 2 illustrates a pulse type receiving system for use with the transmitter of Fig. 1.

Referring to Fig. 1, I have shown a frequency modulated pulse oscillator and amplifier comprising double element vacuum tube amplifier 21. One part of tube 21 is provided with regenerative feed back transformer $T_2$ and the time constant circuit made up of resistance $R_1$ and condenser $C_1$. The resistance $R_2$ and condenser $C_2$ provide a grid bias to the control electrode of the oscillator part of tube 21 and, if desired, may provide a time constant such as to contribute to the frequency of pulse oscillation.

The left hand portion of tube 21 constitutes the generator side, while the right hand portion of tube 21 is the amplifier side for the pulses produced in the generator side. Tube 22 is an amplifier which amplifies the output from the amplifier side of tube 21. The output from amplifier 22 is passed through transformer $T_3$ to the ground connections E, E'. The primary and secondary windings of transformer $T_3$ are adjustable, as shown, to obtain the proper impedance match to the connecting circuits.

In the operation of the system of Fig. 1, the oscillator electrode structure of tube 21 receives anode potential by the charging of condenser $C_1$ through resistance $R_1$. When the anode potential rises high enough, anode current starts, causing transformer $T_2$ to push the oscillator control electrode momentarily positive, thereby causing a rapid discharging of condenser $C_1$ and a charging of condenser $C_2$. The anode current then cuts off, leaving the anode potential low and control electrode bias potential high. Then, after a time, the bias potential decreases by leakage of charge from condenser $C_2$ through resistance $R_2$, while the anode potential rises by charging of condenser $C_1$ through resistance $R_1$, ending in another pulse of anode and grid current. This process repeated at rapid intervals (say at a rate of 20,000 pulses per second, with the pulses very short compared to the time intervals between them) provides the pulse oscillation.

To modulate the frequency of the pulse oscillation, a modulating potential is applied through transformer $T_1$ and the parallel combination of resistance $R_2$ and condenser $C_2$. This causes a variation or modulation in the oscillator grid bias potential which causes anode current to start at variable time intervals following preceding pulses and thereby modulates the pulse frequency.

The modulation may, as an example, comprise voice frequencies ranging from say 150 to 3000 cycles per second, and may be of such an amplitude as to modulate the pulse frequency by a maximum of plus and minus 3000 to 6000 cycles per second.

The frequency modulated pulses are amplified in the amplifier portion of tube 21 and again in tube 22 from which relatively high power pulses are delivered to the spaced ground connections E, E' through impedance adjusting transformer T₃.

At the receiver of Fig. 2, pulse power picked up by the spaced ground connections E'', E''' is amplified in push-pull pulse amplifier 23 and applied to a frequency selective circuit 34 tuned to the mean pulse frequency but broad enough in response to respond to the frequency modulation of the pulses. Energy from the tuned circuit is again amplified and limited to nearly constant value in amplifier 24. The limiting is accomplished largely by virtue of automatic control electrode bias which increases with increasing input, supplied by resistance R₅ shunted by condenser C₅. The resistance and condenser are so chosen as not to respond much to frequencies above the lowest modulation frequency.

Output from amplifier 24 is then applied to a frequency modulation detector comprised of discriminator circuit 25 and push-pull demodulator tube 26. Modulation frequency output from demodulator 26 is amplified in audio amplifier 27 and passed on to headphones 28 through a coupling transformer 29.

In order to prevent or reduce the probability that noise and interference arriving at the receiver between the arrivals of the signal pulses may be heard in the headphones, I provide a feed back path through condenser C₆ to the control electrode bias resistor R₆. As a result of this feed back, the sensitivity or amplification of vacuum tube 23 is modulated by the output alternating current potential of tube 24 in such a direction as to make the amplification maximum when a signal pulse is due to arrive but to make it a lower value for all other time periods between pulses. This is not regeneration of the signal in the ordinary sense since, due to the balanced arrangement of the circuits associated with tube 23, the energy fed back is not reamplified.

In operation, the receiving system may be designed and adjusted for a fixed overall gain, or total amplification, and the output signal strength may be controlled by adjustment of the resistance across the primary winding of the receiver input transformer. This tends to keep all circuit components in correct relative adjustment and is an aid to standardization.

The transmitter and receiver of both the systems of Figs. 1 and 2 may use the same set of ground connections if a switch or relay is provided to connect the ground leads with the transmitter for talking and with the receiver for listening.

The pulse length modulated signals may be received with the receiver of Fig. 2 if the frequency modulation detector shown there is replaced by an amplitude modulation detector and the amplifier 24 is made to operate without limiting. By the application of threshold and limiting effects in the pulse amplifiers, before the pulses are integrated in a frequency selective circuit, it is possible to eliminate substantially all effects of noise and interference so long as the pulse amplitude is more than twice the peak amplitude of the noise and interference and the threshold and limiting amplifier is adjusted so that the transition from no response to full response takes place at inputs about equal to half the pulse amplitude.

Where water is used to replace the soil for a ground, as in the case where the transmitter would be located on a submarine, the two ground electrodes will, of course, be spaced far apart, as in the case when actual soil is employed for ground. The submarine hull can constitute one electrode, while another electrode can be located at the end of a long insulated conductor run out from the submarine.

What is claimed is:

1. A pulse receiving system comprising a push-pull amplifier, an input circuit supplying to said amplifier pulses whose time of occurrence is modulated, said input circuit including a pair of spaced ground connections for receiving the pulses transmitted from a remote point a pulse frequency selective circuit in the output of said amplifier, a limiter coupled to said selective circuit, and a pulse frequency modulation detector coupled to the output of said limiter.

2. A pulse receiving system comprising an amplifier, an input circuit coupled to said amplifier for supplying said amplifier with pulses whose time of occurrence is modulated, a selective circuit tuned to the mean pulse frequency but broad enough to respond to the modulation of the pulses coupled to the output of said amplifier, an amplitude limiting amplifier coupled to said selective circuit, said limiting amplifier comprising a grid-controlled vacuum tube and a demodulator including a discriminator circuit coupled to the output of said amplitude limiting amplifier.

3. A receiving system for pulses whose frequency is modulated, comprising an amplifier, an input circuit coupled to said amplifier for supplying said amplifier with pulses whose frequency is modulated, a selective circuit tuned to the mean pulse frequency but broad enough to respond to the modulation of the pulses coupled to the output of said amplifier, an amplitude limiting grid-controlled amplifier vacuum tube coupled to said selective circuit, a frequency modulation detector including a discriminator circuit coupled to the output of said amplitude limiting amplifier, and a push-pull connected demodulator tube coupled to said discriminator circuit.

4. A pulse receiving system comprising an amplifier, an input circuit coupled to said amplifier for supplying said amplifier with pulses whose time of occurrence is modulated, a pulse frequency selective circuit in the output of said amplifier, an amplitude limiter coupled to said selective circuit, a pulse frequency modulation detector coupled to the output of said limiter, and a feed back circuit from the output of said amplitude limiter to the input of said amplifier for controlling the sensitivity of said amplifier.

5. A pulse receiving system comprising an amplifier, an input circuit coupled to said amplifier for supplying said amplifier with pulses whose time of occurrence is modulated, a selective circuit tuned to the mean pulse frequency but broad enough to respond to the modulation of the pulses coupled to the output of said amplifier, an amplitude limiting amplifier coupled to said selective circuit, a demodulator including a discriminator circuit coupled to the output of said amplitude limiting amplifier, and a feed back circuit from the output of said amplitude limiting amplifier to the input of said first amplifier for controlling the sensitivity of said first amplifier.

6. A pulse receiving system comprising an amplifier, an input transformer having a secondary winding coupled to said amplifier and a primary winding coupled to a source of pulses, a variable resistor across the primary winding of said transformer, a pulse frequency selective circuit in the output of said amplifier, an amplitude limiter coupled to said selective circuit, a detector coupled to the output of said limiter, and a feed back circuit from the output of said limiter to the input of said amplifier.

7. The method of operating a pulse receiver which comprises receiving time modulated pulses, amplifying the received pulses, limiting the amplified pulses, demodulating the amplified-limited pulses, and feeding back amplified energy, prior to demodulation, from one portion of said receiver to a preceding portion in such sense as to reduce the gain during intervals between received pulses.

8. A receiving system for pulses whose frequency is modulated, comprising an amplifier, an input circuit coupled to said amplifier for supplying said amplifier with pulses whose frequency is modulated, a selective circuit tuned to the mean pulse frequency but broad enough to respond to the modulation of the pulses coupled to the output of said amplifier, an amplitude limiting grid-controlled amplifier vacuum tube coupled to said selective circuit, said limiting amplifier having a parallel combination of condenser and resistor for automatically controlling the bias on said grid, the values of said resistor and condenser being so chosen that they do not respond much to frequencies above the lowest modulation frequency, a frequency modulation detector including a discriminator circuit coupled to the output of said amplitude limiting amplifier, and a push-pull connected demodulator tube coupled to said discriminator circuit.

CLARENCE W. HANSELL.

REFERENCES CITED

The following references are of record in the file of this patent:

UNITED STATES PATENTS

| Number | Name | Date |
| --- | --- | --- |
| 2,262,406 | Rath | Nov. 11, 1941 |
| 2,363,651 | Crosby | Nov. 28, 1944 |